(12) United States Patent
Weller

(10) Patent No.: US 11,709,408 B2
(45) Date of Patent: Jul. 25, 2023

(54) DISPLAY SYSTEM WITH AUGMENTED FOCAL POINT

(71) Applicant: GENTEX CORPORATION, Zeeland, MI (US)

(72) Inventor: Andrew D. Weller, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 225 days.

(21) Appl. No.: 17/089,031

(22) Filed: Nov. 4, 2020

(65) Prior Publication Data

US 2021/0141280 A1    May 13, 2021

Related U.S. Application Data

(60) Provisional application No. 62/931,977, filed on Nov. 7, 2019.

(51) Int. Cl.
*G02F 1/157* (2006.01)
*G02B 17/08* (2006.01)
*B60R 1/00* (2022.01)

(52) U.S. Cl.
CPC ............... *G02F 1/157* (2013.01); *B60R 1/00* (2013.01); *G02B 17/0816* (2013.01);
(Continued)

(58) Field of Classification Search
CPC ..... G02F 1/157; B60R 1/00; B60R 2300/105; B60R 2300/205; B60R 2300/303; B60R 2300/8066; G02B 17/0816; G02B 27/0101
See application file for complete search history.

(56) References Cited

U.S. PATENT DOCUMENTS

2016/0202479 A1    7/2016   Okayama
2016/0202482 A1*   7/2016   Kuzuhara .......... G02B 27/0179
                                                      359/633
(Continued)

FOREIGN PATENT DOCUMENTS

EP       0602934 B1       3/1999
JP    2017049371 A  *    3/2017
(Continued)

OTHER PUBLICATIONS

International Search Report dated Feb. 18, 2021, for corresponding PCT application No. PCT/US2020/058818, 2 pages.
(Continued)

*Primary Examiner* — Howard D Brown, Jr.
*Assistant Examiner* — Tyler B Edwards
(74) *Attorney, Agent, or Firm* — Price Heneveld LLP; Brian James Brewer

(57) ABSTRACT

A device and system for augmenting the focal length of an electronic display. The device may comprise a display, a first mirror, a second mirror, and a lens. The display is operable to emit light corresponding to a first image in a first direction. The first mirror has a first focal length and is operable to reflect light from the first direction to a second direction. The second mirror has a second focal length and is operable to reflect light from the second direction to a third direction. The lens has a third focal length and is operable to transmit light from the third direction. Further, the light transmitted by the lens is viewable by a user as a second image. Additionally, the perceived distance from the user to the second image is greater than a distance from the user to the lens.

20 Claims, 8 Drawing Sheets

(52) U.S. Cl.
CPC ... *B60R 2300/105* (2013.01); *B60R 2300/205* (2013.01); *B60R 2300/303* (2013.01); *B60R 2300/8066* (2013.01)

(56) References Cited

U.S. PATENT DOCUMENTS

| | | | |
|---|---|---|---|
| 2019/0094560 A1 | 3/2019 | Weller | |
| 2019/0299858 A1* | 10/2019 | Imamura | B60R 1/00 |
| 2019/0302451 A1* | 10/2019 | Shi | G02B 27/0101 |

FOREIGN PATENT DOCUMENTS

| | | |
|---|---|---|
| JP | 2017049371 A | 3/2017 |
| WO | 2008002989 A3 | 1/2008 |
| WO | 2016170191 A1 | 10/2016 |

OTHER PUBLICATIONS

Written Opinion dated Feb. 18, 2021 for corresponding PCT application No. PCT/US202/058818, 4 pages.

\* cited by examiner

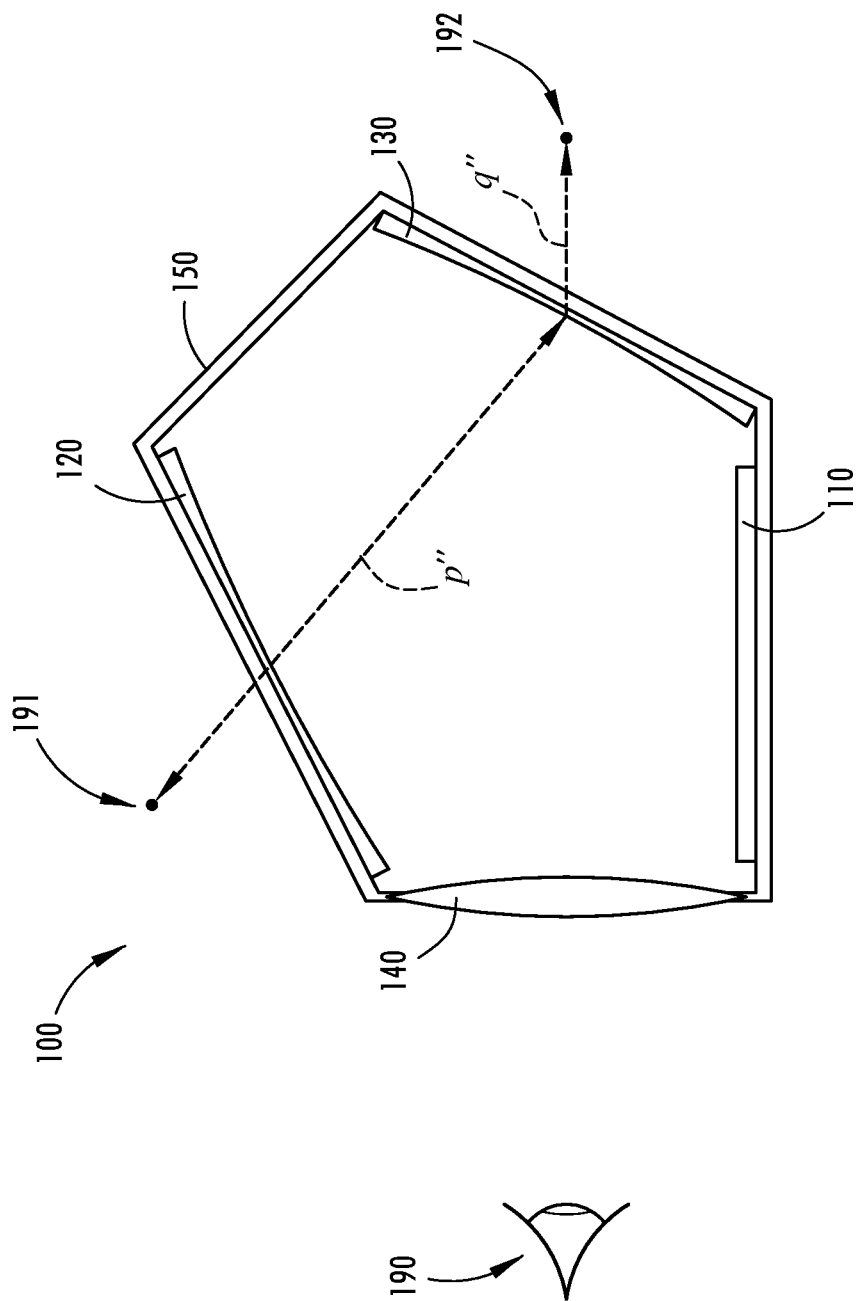

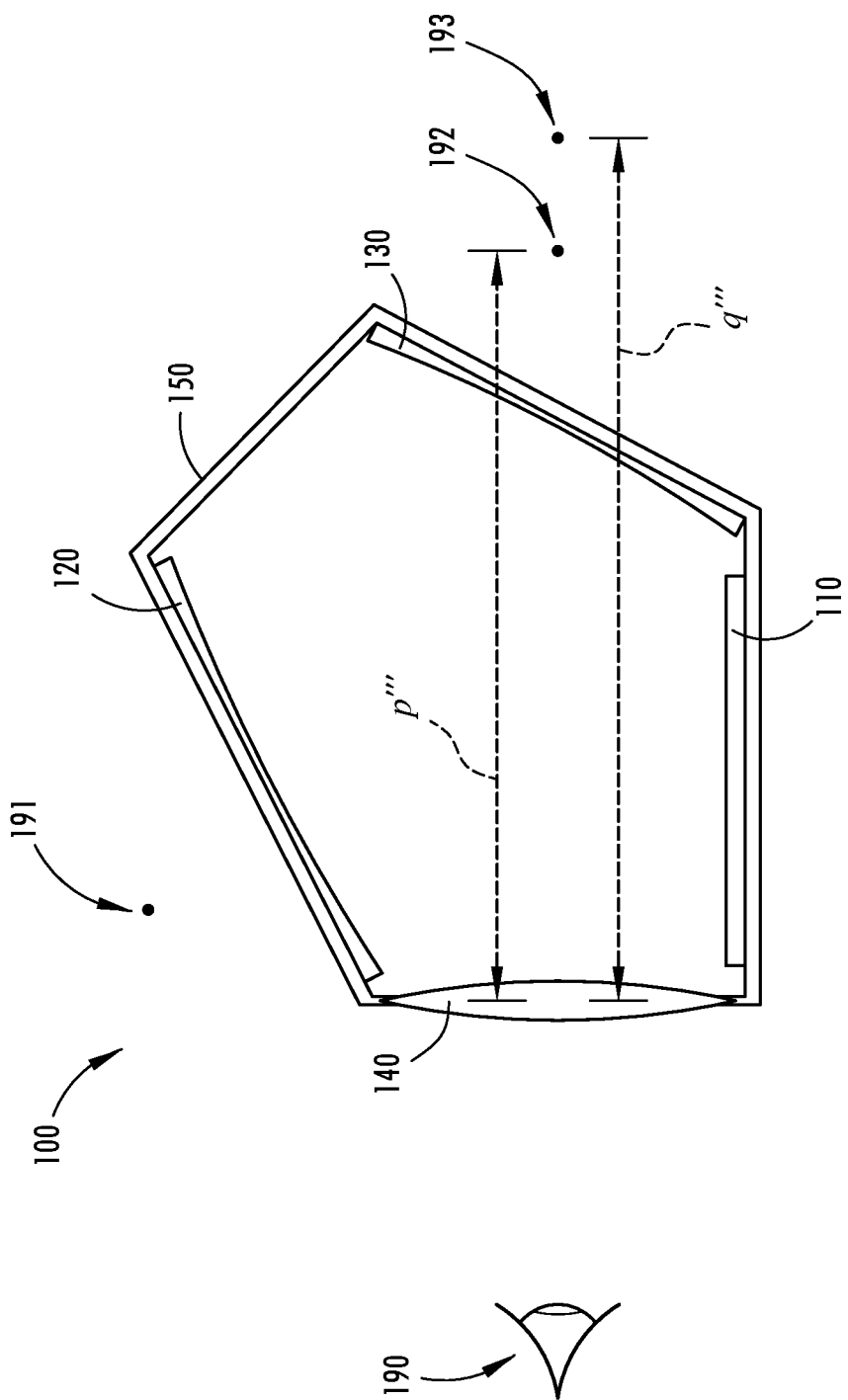

DISPLAY SYSTEM WITH AUGMENTED FOCAL POINT

CROSS-REFERENCE TO RELATED APPLICATIONS

This application claims priority under 35 U.S.C. § 119(e) to U.S. Provisional Application No. 62/931,977 filed on Nov. 7, 2019, entitled "DISPLAY SYSTEM WITH AUGMENTED FOCAL POINT," the disclosure of which is hereby incorporated by reference in its entirety.

FIELD OF INVENTION

The present disclosure generally relates to display devices, and more particularly, to display devices operable to display an image perceivable as being further away than the display device.

BACKGROUND OF INVENTION

In vehicles, electronic displays used in place of a rearview mirrors have been well known for many years and are increasing in popularity. However, such systems are problematic. When a driver operates a vehicle, they are often looking ahead in the distance; accordingly, their eyes are fixed at a great focal length. However, when the driver looks at the rear-view display, the focal length is only to the electronic display—a much shorter focal length. Some drivers struggle to adjust between these focal lengths.

Visual accommodation is the process by which eyes focus between objects at various distances. For example, accommodation occurs when changing focus from a nearby object (e.g. an electronic rearview display) to a far-off object (e.g. traffic down a road). However, the amplitude or effective accommodation for humans typically declines with age and may further be complicated by various additional visual disorders.

In order to reduce visual strain caused by visual accommodation, systems have been developed for augmenting the focal length of an electronic display. However, in order for current systems to adequately extend the focal length of an electronic display, these systems must be too large and bulky for practical use in a vehicle and systems of a sufficiently small size do not adequately extend the focal length of the display. Accordingly, improved systems for augmenting the focal length of an electronic display are needed that provide greater levels of focal length increase while enabling a smaller system size.

SUMMARY

In accordance with the present disclosure, the disadvantages and problems associated with operating an electrochromic device in the past are eliminated or reduced.

In accordance with one aspect of the present disclosure, a device comprising a display, a first mirror, a second mirror, and a lens is disclosed. The display is operable to emit light corresponding to a first image in a first direction. The first mirror has a first focal length and is operable to reflect light from the first direction to a second direction. The second mirror has a second focal length and is operable to reflect light from the second direction to a third direction. Further, the second mirror may be disposed in the second direction relative the first mirror at a distance less than or equal to the second focal length. In some embodiments, the second mirror may be disposed in the second direction relative the display at a distance less than or equal to the respective distance to the second focal point. The lens has a third focal length and may be operable to transmit light from the third direction to a fourth direction. Moreover, the lens may be disposed in the third direction relative the second mirror at a distance less than or equal to the third focal length. In some embodiments, the lens may be a magnifying lens. Further, the light transmitted in the fourth direction is viewable by an user as a second image. Additionally, the perceived distance from the user to the second image is greater than a distance from the user to the lens. In some embodiments, the second image may appear to be at least 150 mm further from the user than the lens.

In some embodiments, the image may be corrected by at least one of the lens, the first mirror, the second mirror, a second lens, and a curve in the display. The second lens may be disposed in the first direction relative the display. In some further embodiments, at least one of the lens, the first mirror, and the second mirror may comprise a cylindrical access bend.

In some embodiments, the lens may be aligned with an opaque surface such that a line between an user and the opaque surface intersects with the lens. Further, in such an embodiment, the display may be operable to display an image corresponding to a scene opposite the opaque surface relative to the user, such that the user may perceive the scene through the opaque surface.

In some embodiments, the device may further comprise a housing. The housing may have an opening. Additionally, the housing may substantially enclose the display, the first mirror, the second mirror, and/or the lens. Further, the opening may be substantially aligned with the lens.

In some embodiments, an imager may be communicatively connected to the display. The imager may be operable to capture an image of a scene. Further, the first image may correspond to the scene. In some further embodiments, the scene may correspond to an area substantially rearward relative a vehicle to which the imager is associated with.

In some embodiments, the second image is substantially the entirety of the first image. In other embodiments, the second image is only part of the first image. In such an embodiment, the part of the first image corresponding to the second image may change based, at least in part, on the user's position. Additionally, in some embodiments, a user interface may be operable to move the first image such that the part corresponding to the second image changes.

In some embodiments, the device may further comprise a second imager. The second imager may be communicatively connected to the display. Additionally, the second imager may be operable to image a second scene. The second scene and the scene may be stitched together to form the first image.

In accordance with another aspect of the present disclosure, a device comprising a display, a plurality of mirrors, and a lens is disclosed. The display is operable to emit light corresponding to a first image in a first direction. Each mirror of the plurality of mirrors have a focal length and are operable to reflect light from one direction to another direction. Further, the plurality of mirrors, in cooperation, are operable to reflect light from the first direction to a second direction. The lens has a third focal length, and the lens is operable to transmit light form the third direction to a fourth direction. Moreover, the light transmitted in the fourth direction is viewable by a user as a second image and has a perceived distance from the user greater than the distance from the user to the lens. Additionally, the second image may only be part of the first image. In some embodiments, the part of the first image corresponding to the second image may change based, at least in part, on the user's position. In some embodiments, the device may further comprise a user interface operable to move the first image such that the part corresponding to the second image changes.

The advantages of certain embodiments of the present disclosure include reduced eye strain due to visual accommodation, an augmented display device that takes up less space for a given amount of augmentation, a movable perceived second image, and a calibratable field of view. First, in embodiments reducing eye strain due to visual accommodation, the display device makes the first image emitted by the display perceivable as a second image having an appearance as if it were at a distance from a user greater than the distance from the user to the display device. Therefore, when a user shifts gaze from a distant scene to the display device, the change between the focal distance of the distant scene and the focal distance of the second image is reduced, minimized, or eliminated, thereby reducing eye strain caused by visual accommodation.

Second, in embodiments where the display device takes up less space, some embodiments have the advantage of a smaller device size. Incorporating multiple mirrors into the display device allows for the added perceived distance to take on an aggregate affect from a multitude of mirrors and lenses. To achieve the same affect, a device with only one mirror would require larger surface areas and greater distances. Accordingly, the display device requires less space to achieve a given focal length augmentation.

Third, in embodiments enabling a movable perceived second image, the display may serve as a part of an augmented display device and the second image perceived by the user may change in response to a change in the position of the user. The second image being movable as a result of movement of a user resulting in a change of the user's perspective is advantageous because it creates an image that is searchable in that a user may cause their field of view to change by moving their head. This searchable field of view may be like a user would experience with a standard rearview mirror and therefore provides a more familiar and desirable user experience.

Fourth, in embodiments where the device has a calibratable field of view, the display may adjust the position of the first image. Therefore, desirable portions of the first image may be better aligned with a boundary of the second image. Thus, the device may provide better second image alignment with the first image from a range of user positions that may otherwise produce undesirable alignment of the second image with the first image.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features in other embodiments.

BRIEF DESCRIPTION OF FIGURES

In the drawings:

FIG. 1c: A cross sectional schematic representation of a display device illustrating image projection of a second mirror therein.

FIG. 1d: A cross sectional schematic representation of a display device illustrating image projection of a lens therein.

DETAILED DESCRIPTION

Figure 1A:
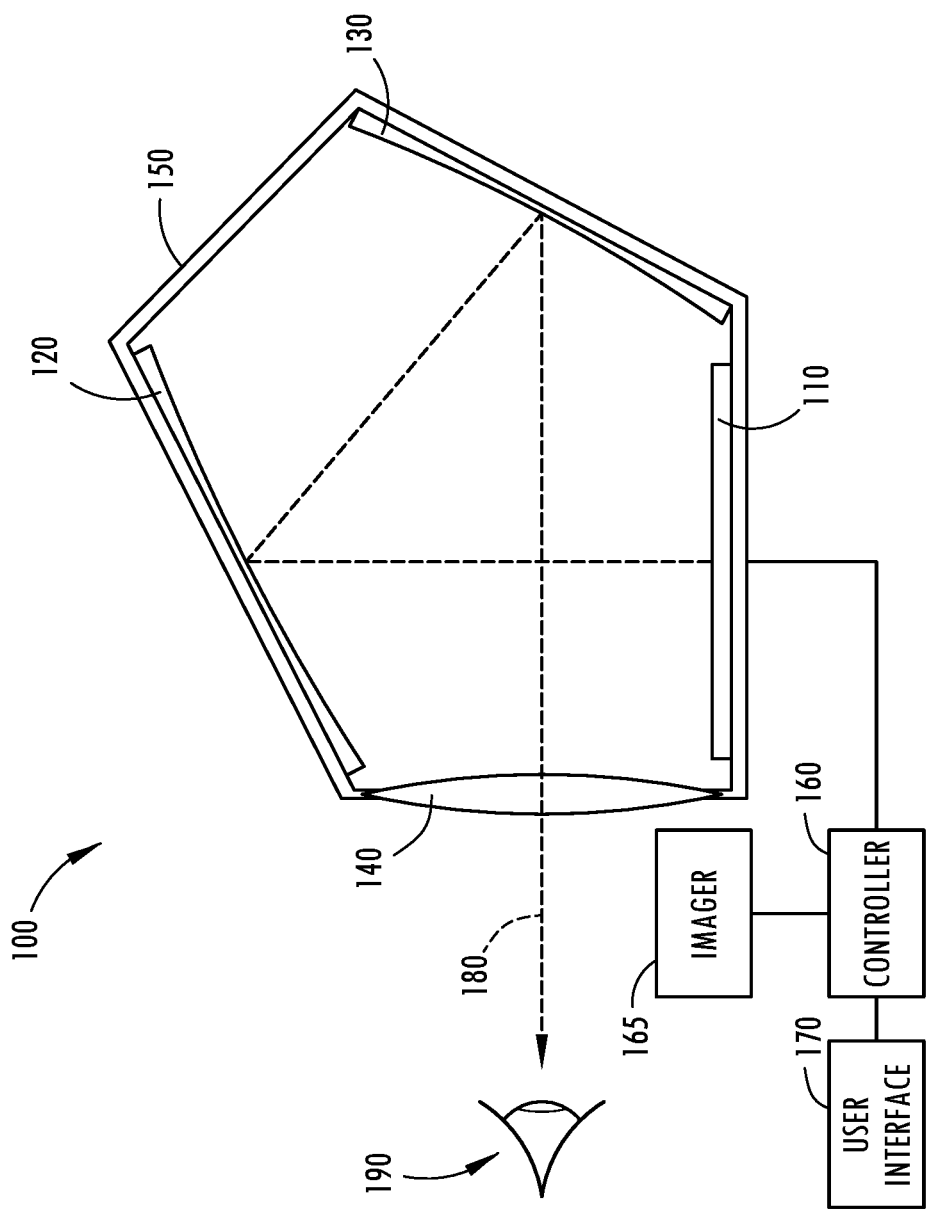
FIG. 1a: A cross sectional schematic representation of a display device.

For the purposes of description herein, the specific devices illustrated in the attached drawings and described in this disclosure are simply exemplary embodiments of the inventive concepts defined in the appended claims. Hence, specific dimensions and other physical characteristics relating the embodiments disclosed herein are not limiting, unless the claims expressly state otherwise.

The present disclosure is directed to a system for augmenting the focal length of an electronic display and enabling smaller system sizes for a given focal length augmentation. Accordingly, an augmented display system is disclosed.

FIGS. 1a-e are cross sectional schematic representations of a display device 100. Display device 100 comprises a display 110, a first mirror 120, a second mirror 130, and a lens 140. In some embodiments, display device 100 may also comprise a housing 150, a controller 160, an imager 165, and/or a user interface 170.

Display 110 may be any device operable to emit light corresponding to a first image. For example, display 100 may be LCD, LED, OLED, plasma, DLP, or other technology. The first image may be derived, at least in part, from image data captured by an imager 165 such as a rear-view camera or a side-view camera on a vehicle.

First mirror 120 may be any device operable to reflect light. Further, first mirror 120 may comprise a first surface operable to reflect light. The first surface may be concave. Accordingly, first mirror 120 may have a first focal length. The first surface, for example, may have a radius of about 1,000, 1,500, 2,500, or 3,000 mm. Additionally, first mirror 120 may be disposed less than or equal to 100, 90, 80, 70, 60, 55, 50, 45, or 40 mm from display 110.

Second mirror 130 may likewise be any device operable to reflect light. Further, second mirror 120 may comprise a second surface operable to reflect light. The second surface may be concave, convex, or flat. Accordingly, second mirror 130 may have a second focal length. Further, the second concave surface may also have a radius of about 1,000, 1,500, 2,500, or 3,000 mm. Additionally, second mirror 130 may be disposed less than or equal to 100, 90, 80, 70, 60, 55, 50, 45, 40, 35, or 30 mm from first mirror 120 along an optical pathway 180.

Lens 140 may be any device operable to transmit light therethrough and magnify an image corresponding to the light. For example, lens 140 may be a convex lens, Fresnel lens, double convex lens, lenticular lens, or holographic lens. Accordingly, lens 140 may have a third focal length. The third focal length, for example, may be about 200, 300, 350, 400, 500, or 600 mm. In some embodiments, lens 140 may be configured to adjust focal length. Additionally, lens 140 may be disposed less than or equal to 100, 90, 80, 70, 60, 55, 50, 45, 40, 35, or 30 mm away second mirror 130 along optical pathway 180.

Display device 100 may comprise an image correction mechanism to correct distortion attributed to viewing images through a lens. For example, the image correction mechanism may comprise a cylindrical access bend. In some embodiments, at least one of lens 140, first mirror 120, and second mirror 130 may comprise the image correction mechanism. In other embodiments, a second lens may be disposed on display 110 or in the first direction relative display 110. The second lens may contain the correction mechanism. Further, in some embodiments, display 110 may be bent or curved to provide for an image correction mechanism.

In some embodiments, display 110 may have a larger display area than the surface area of first mirror 120. Accordingly, a searchable, viewing image may be enabled.

Display 110, first mirror 120, second mirror 130, and lens 140 are disposed such that an optical pathway 180 is created. Optical pathway 180 is such that: light emitted by display 110, in a first direction, may be reflected by first mirror 120, in a second direction; the light reflected in the second direction may be reflected by second mirror 130 in a third direction; and the light reflected in the third direction may be transmitted in a fourth direction by lens 140. Accordingly, light emitted by display 110, in the first direction, may be viewable by a user 190, in the fourth direction. Further, first mirror 120 may be disposed such that display 110 is at or within the first focal length, second mirror 130 may be disposed such that first mirror 120 is at or within the second focal length, and/or lens 140 may be disposed such that second mirror 130 is at or within the third focal length.

Housing 150 may be any structure operable to substantially enclose display 110, first mirror 120, second mirror 130, and lens 140. Further, housing 150 comprises an opening substantially aligned with lens 140, thereby enabling the optical path 180 to enter an interior defined by housing 150. Housing 150 may be disposed in a vehicle interior. For example, housing 150 may be disposed on vehicle windshield, headliner, information center, instrument cluster, or dashboard. Alternatively, housing 150 may be disposed on a vehicle exterior. For example, housing 150 may be disposed on a side of the vehicle as a side mirror replacement. Further, in some embodiments, housing 150 may be substantially opaque to prevent outside light from entering the optical pathway 180.

Additionally, housing 150 may be disposed on an opaque surface such that a line between user 190 and the opaque surface intersects with lens 140. In such an embodiment, the first image may correspond to a scene opposite the opaque surface relative user 190. Accordingly, user 190 may perceive the scene through the opaque surface. Further, the first image may comprise other indicia for conveying information to user 190. The other indicia may correspond to information such as a rate of travel, navigation directions, compass directions, engine RPM, engine temperature, radio information, or phone information. Therefore, a virtual heads up display may be enabled.

Controller 160 is communicatively connected to display 110 and may be any device operable to control the first image emitted by display 110. Accordingly, controller 160 may control display 110 to emit a first image derived from image data generated by imager 165. Further, controller 160, may be operable to change the position of an image on display 110 or change an extent to which the image is displayed. Additionally, controller 150 may be operable to turn display 110 on and off.

Imager 165 may be any device operable to capture a first image. Accordingly, imager 165 may be a camera, such as a rear-view or a side view camera. Further, imager 165 may be communicatively connected to controller 160 and/or display 110. Thus, controller 160 may be operable to control the first image emitted by display 110 such that the first image corresponds to a scene captured by imager 165. The scene may correspond to an area rearward relative the vehicle. In some embodiments, more than one imager 165 may be communicatively connected to controller 160. Further, controller 160 may stitch together images, from more than one imager 165, into a first image.

User interface 170 may be any device operable to accept input from a user. For example, user interface 170 may be a touch screen, a capacitive touch surface, or a physical button. Further, user interface 170 may be communicatively connected to controller 160. In some embodiments, a capacitive touch surface may be disposed on lens 140.

In operation, display device 100 augments a focal length to view an image emitted by display device 100. The first image is emitted by display 110, in a first direction. Subsequently, the light follows an optical pathway though display device 100. In accordance with the optical pathway, all or part of the first image is reflected by first mirror 120, in a second direction; all or part of the light reflected in the second direction may be reflected by second mirror 130 in a third direction; and all or part of the light reflected in the third direction may be transmitted in a fourth direction by lens 140. In some embodiments, the third direction and the fourth direction are the same. In other embodiments, the third direction and the fourth direction are not the same. The light transmitted in the fourth direction is directed outside housing 150 and perceivable by a user 190. Accordingly, user 190 perceives all or part of the transmitted light as a second image. However, instead of perceiving the second image as originating the from lens 140, user 190 may perceive the second image as originating from a point at a greater distance away from user 190 than lens 140.

Each of first mirror 120, second mirror 130, and lens 140 may contribute to the increase in perceived distance of the second image as the emitted light follows optical pathway 180. Each of first mirror 120, second mirror 130, and lens 140 contributing to the increase in perceived distance may have a focal length. The lens or curved mirror may produce an "image" of a transmitted/reflected object—in this case the emitted light of the first image—in accordance with the lens or curved mirror's focal length. This "image" may have a perceived distance of greater than that between the object and the lens/mirror. The relationship may generally be quantified by the following equation:

$$\frac{1}{f} = \frac{1}{p} + \frac{1}{q}$$

where f is "focal length," p is "object distance," and q is "image distance." "Object distance" refers to a distance between a transmitted/reflected object and the center of the lens or the reflective surface of the curved mirror, respectively. "Image distance" may be referred to generally as a distance between the reflective surface of the curved mirror or the center of the lens and a perceivable "image" of the object. Further, "image distance" is quantified as positive in magnitude in the interior direction of a curved surface of a concave mirror. Accordingly, an image perceived as behind the curved surface of the concave mirror have a negative q value.

Figure 1B:
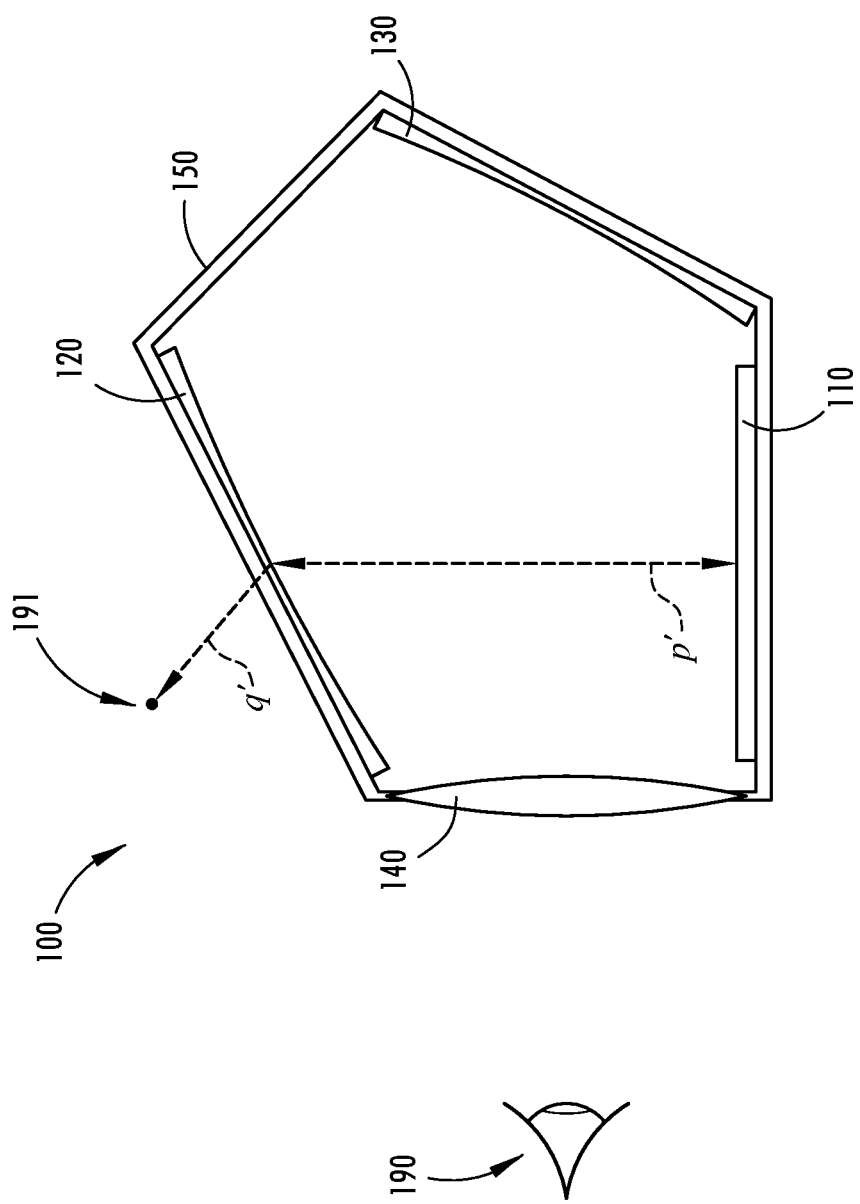
FIG. 1b: A cross sectional schematic representation of a display device illustrating image projection of a first mirror therein.
Figure 1E:
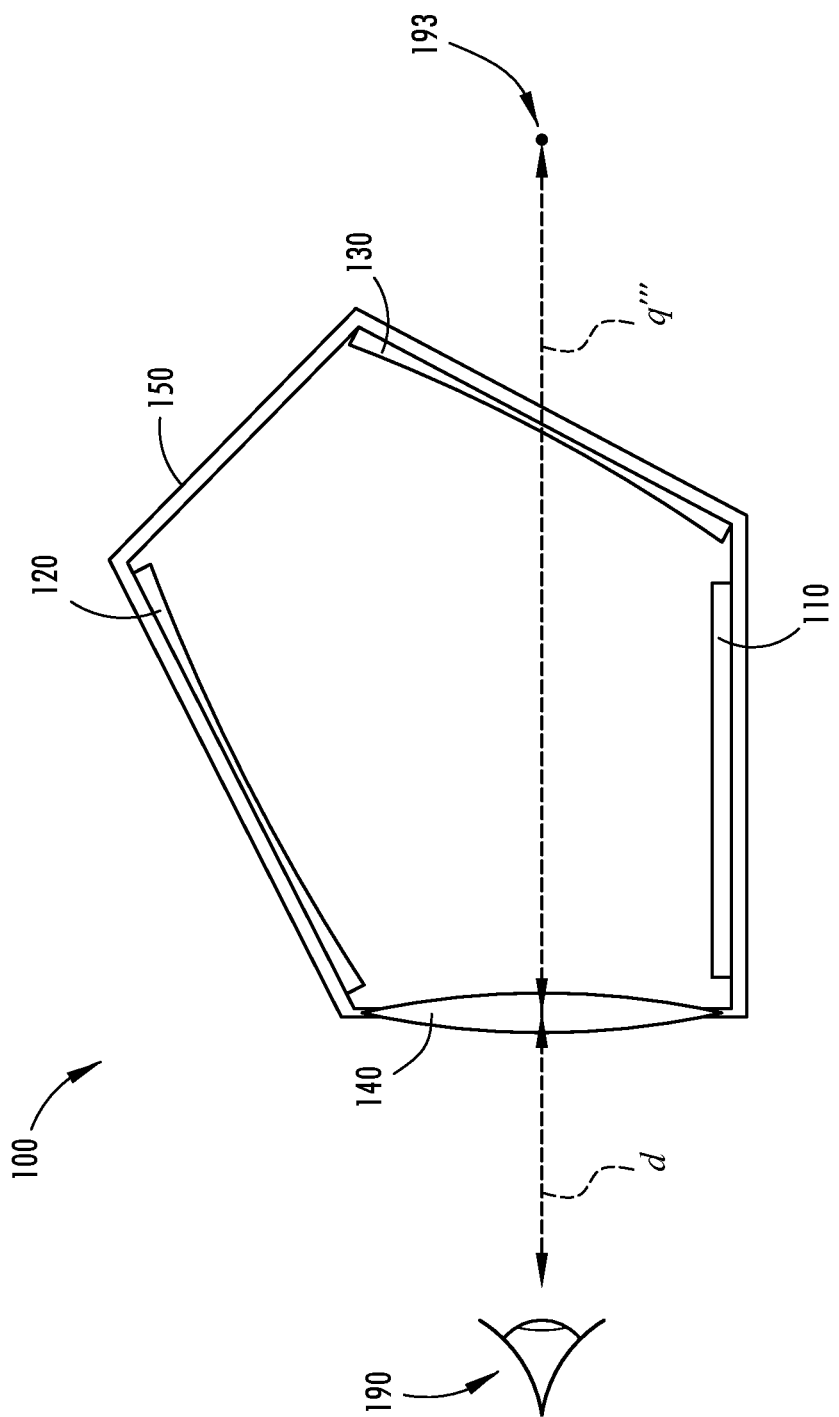
FIG. 1e: A cross sectional schematic representation of a display device illustrating perception of a second image by a user.

Therefore, in some embodiments, display device 100 may project a second image corresponding to the first image emitted by display 110, in accordance with the following relationships shown in FIGS. 1*b-e*. As shown in FIG. 1*b*, for first mirror 120, object distance is a distance from display 110 to second mirror 120 along optical pathway 180, shown as p', and a perceivable image is produced at first point 191, having an image distance shown as q'. For subsequent mirrors and lenses, the object is treated as at a point (e.g. first point 191) to which the object is perceived, as derived from the previous image distance. As shown in FIG. 1*c*, for second mirror 130, object distance is a distance from first point 191 to second mirror 120, shown as p", and a perceivable image is produced at second point 192, having an image distance shown as q". As shown in FIG. 1*d*, for lens 140, object distance is a distance from second point 192 to lens 140, shown as p''', producing a perceivable image at third point 193, having an image distance shown as q'''. Accordingly, as shown in FIG. 1*e*, user 190 may observe all or part of the first image emitted by display 110 as the second image, where the second image is perceived as at third point 193. Therefore, user 190 perceives the second image as having a focal length of d+q''', where d is the distance from user 190 to lens 140 and q''' is the image distance created by lens 140. In some embodiments, q'''—the increase in perceived distance of the second image beyond lens 140—may relate to a distance of about 200, 225, 250, 275, 300, 400, or 500 mm or more.

Some embodiments have the advantage of reduced eye strain due to visual accommodation. Display device 100 makes the first image emitted by display 110 perceivable as a second image having an appearance as if it were at a distance from user 190 greater than the distance from user 190 to display device 100. Therefore, when user 190 shifts gaze from a distant scene to display device 100, the change between the focal distance of the distant scene and the focal distance of the second image is reduced, minimized, or eliminated, thereby reducing eye strain caused by visual accommodation. Additionally, some embodiments have the advantage of a smaller device size. Incorporating multiple mirrors into display device 100 allows for the added perceived distance to take on an aggregate affect from a multitude of mirrors and lenses. To achieve the same affect, a device with only one mirror would require larger surface areas and greater distances. Accordingly, display device 100 requires less space to achieve a given focal length augmentation.

Figure 2A:
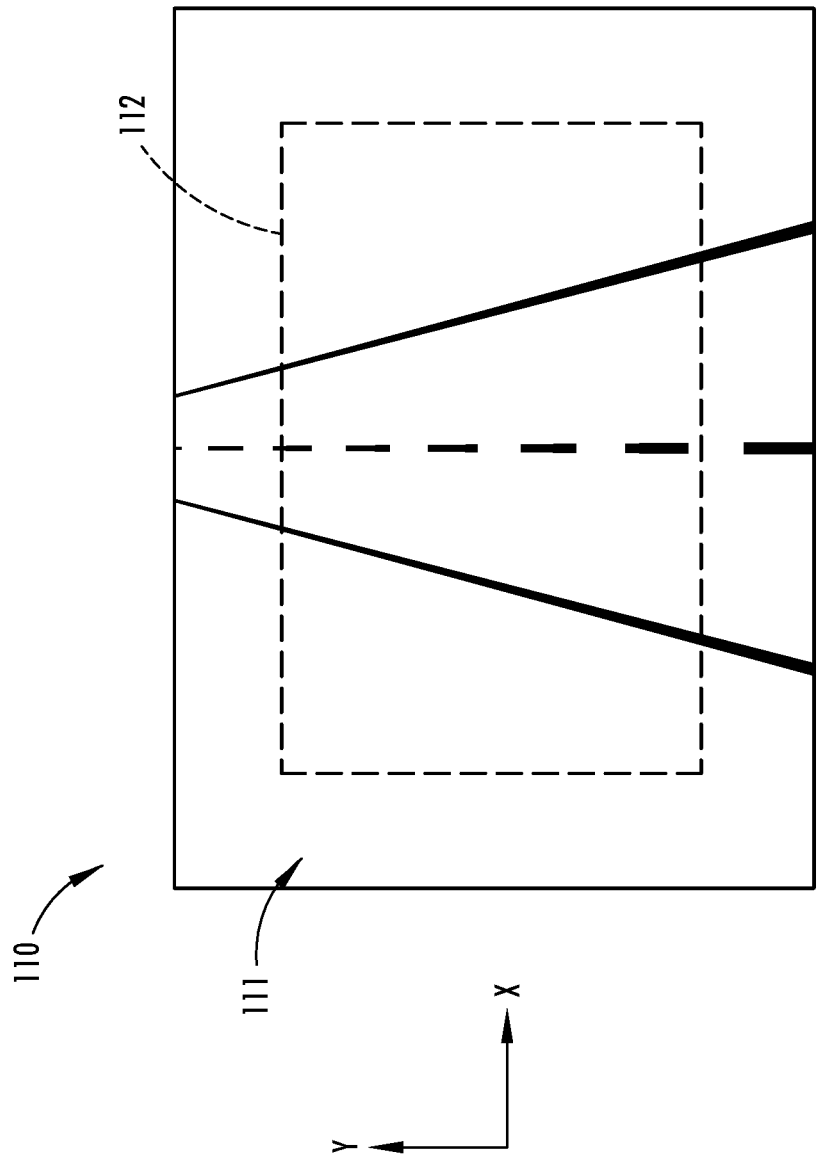
FIG. 2a: A schematic representation of a first image emitted by a display.
Figure 2B:
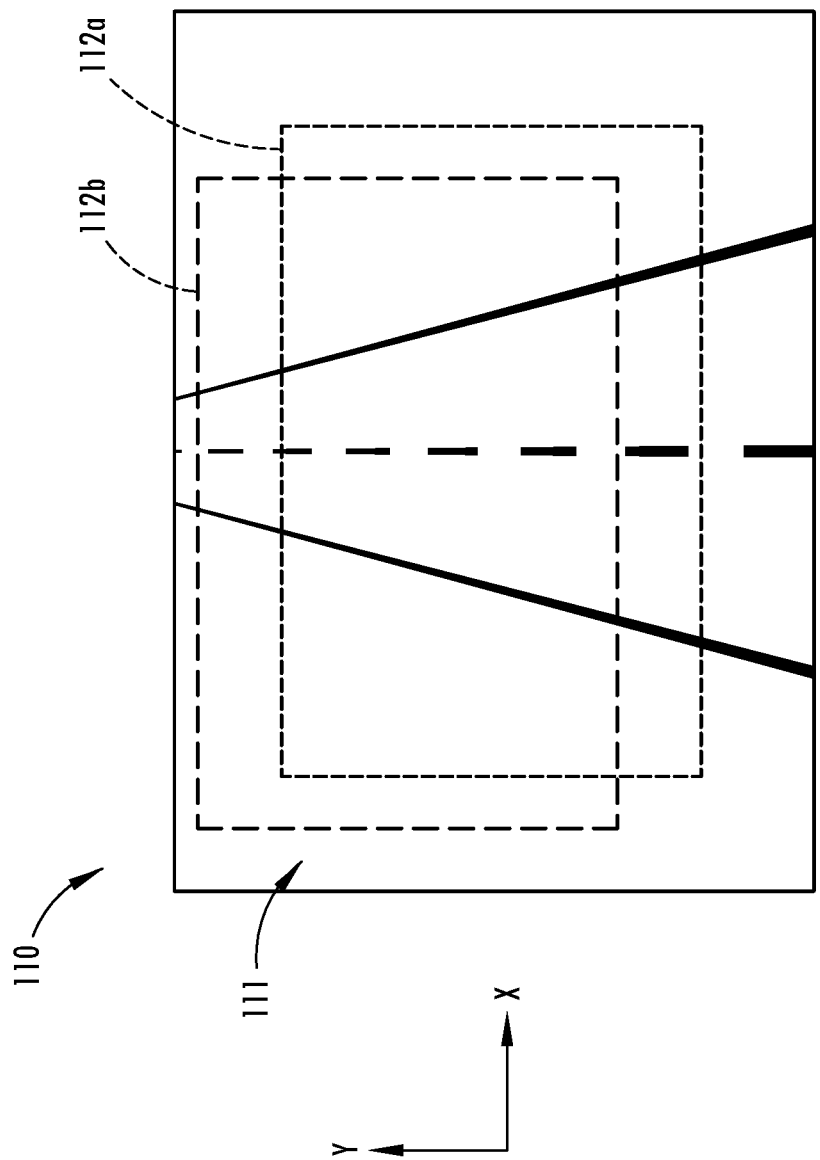
FIG. 2b: A schematic representation of a first image emitted by a display and illustration of a movable second image alignment.
Figure 2C:
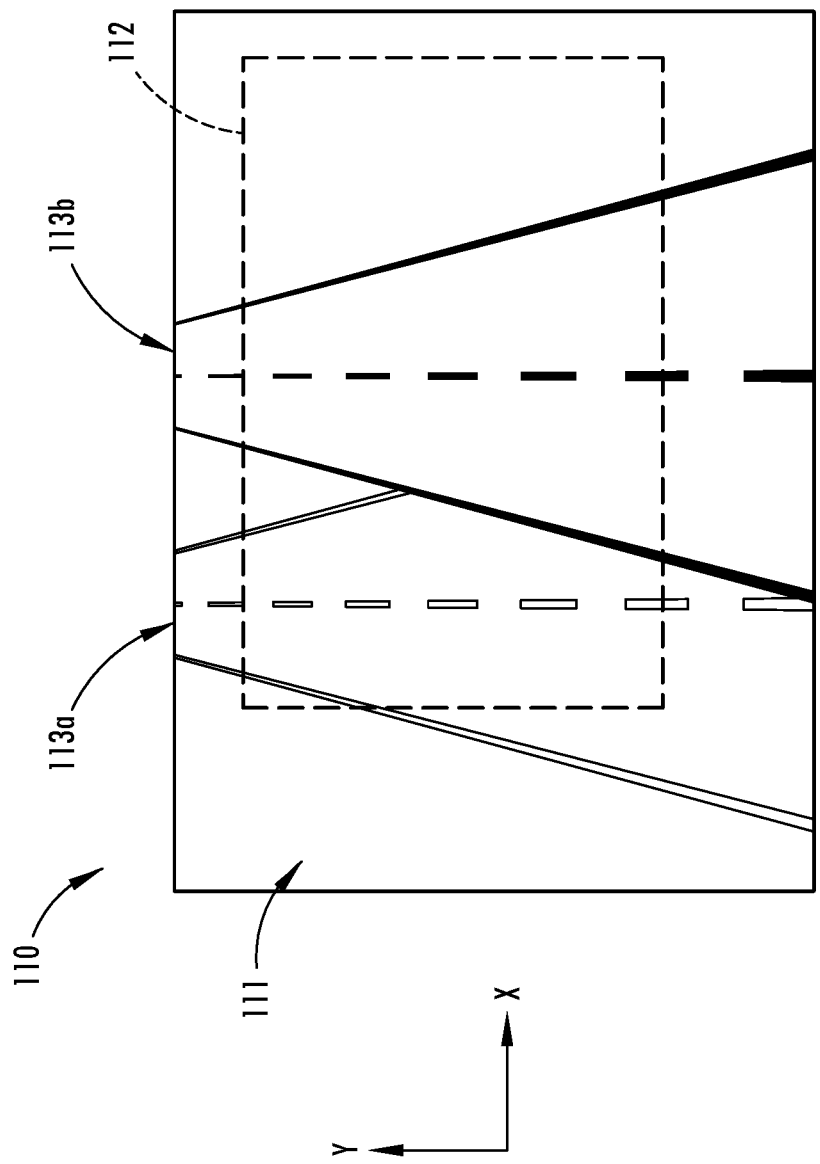
FIG. 2c: A schematic representation of a movable first image emitted by a display.

FIGS. 2*a-c* are schematic representations of a first image emitted by a display 110. Display 110 may be a part of an augmented display device. The augmented display device comprises display 100, a plurality of mirrors, and a lens. Accordingly, the augmented display device may be operable to emit an image having an appearance as if it were at a distance from a user greater than the distance from the user to the augmented display device.

Display 110 may be any device operable to emit light, corresponding to a first image, from a display surface 111. For example, display 100 may be LCD, LED, OLED, plasma, DLP, or other technology. The first image may be derived, at least in part, from image data captured by a camera such as a rear-view camera or a side-view camera on a vehicle.

Each mirror of the plurality of mirrors have a focal length and are operable to reflect light from one direction to another direction. Each mirror may comprise a concave surface. Further, each mirror may have a radius of about 1,000, 1,500, 2,500, or 3,000 mm. Further, the plurality of mirrors, in cooperation, reflect light from the first direction to a second direction.

The lens may be any device operable to transmit light therethrough and magnify an image corresponding to the light. For example, the lens may be a convex lens, Fresnel lens, double convex lens, lenticular lens, or cylindrical lens. Accordingly, the lens has a focal length. The focal length, for example, may be about 200, 300, 350, 400, 500, or 600 mm.

Display 110, the plurality of mirrors, and the lens are disposed such that an optical pathway is created. The optical pathway is such that: light emitted by display 110, in a first direction, may be reflected by the plurality of mirrors, in a second direction, and the light reflected in the second direction may be transmitted, in a third direction, by the lens. Accordingly, light emitted by display surface 111, in the first direction, may be viewable by a user, in the third direction. Further, these elements may be disposed in relation to one another such that the augmented display device augments the focal length of the first image, emitted by display 110, such that a second image is perceivable by a user and instead of perceiving the second image as originating the from the lens, the user may perceive the second image as originating from a point at a greater distance away from the user than the lens.

However, in some embodiments, the second image may correspond to only a part of the first image. In FIGS. 2*a-c*, a boundary 112 of the second image is shown. Further, boundary 112 may be influenced by a location of the user. Accordingly, the user may move, thereby changing their perspective and causing boundary 112 to move in the X and/or the Y direction, from a first position 112*a* to a second position 112*b*, as shown in FIG. 2*b*.

Additionally, in some embodiments, since boundary 112 may be influenced by the location of the user, boundary 112 may not align with the first image in a desirable manner. Accordingly, the first image may be adjusted from a first position 113*a* or first part of a scene to a second position 113*b* or a second part of the scene, as shown in FIG. 2*c*. For, example, the first image may correspond to a scene of a roadway and the first image may be adjusted to center the roadway in the center of the second image. Further, display 110 may be communicatively connected to a user interface. The user interface may be any device operable to accept input from a user. For example, the user interface may be a touch screen, capacitive touch surface, or physical button. In some embodiments, a capacitive touch surface may be disposed on the lens. Accordingly, the input from the user interface may be operable to adjust the position of the first image.

Accordingly, in operation, display 110 may serve as a part of an augmented display device and thereby enable the second image perceived by the user to change in response to a change in the position of the user. Therefore, in addition to the advantage of reduced eye strain, due to visual accommodation, some embodiments have the advantage of a movable perceived second image. The second image being movable as a result of movement of a user resulting in a change of the user's perspective is advantageous because it creates an image that is searchable in that a user may cause their field of view to change by moving their head. This searchable field of view may be like a user would experience with a standard rearview mirror and therefore provides a more familiar and desirable user experience. Additionally, display 110, in operation, may adjust the position of the first image. Therefore, some embodiments have the advantage of calibration of the second image such that desirable portions of the first image better aligned with boundary 112 of the second image. Thus, the augmented display device may provide better second image alignment with the first image from a wider range of user positions that may otherwise produce undesirable alignment of the second image with the first image.

In this document, relational terms, such as "first," "second," "third," and the like, are used solely to distinguish one entity or action from another entity or action, without necessarily requiring or implying any actual such relationship or order between such entities or actions.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; A and C in combination; B and C in combination; or A, B, and C in combination.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A device comprising:
   a display operable to emit light in a first direction, the emitted light corresponding to a first image;
   a first mirror having a first focal length, the first mirror operable to reflect the light from the first direction to a second direction;
   a second mirror having a second focal length, the second mirror operable to reflect the light from the second direction to a third direction; and
   a lens having a third focal length, wherein the lens receives the light from the third direction and emits the light in a fourth direction;
   wherein:
   the light transmitted in the fourth direction is aligned with a viewing direction of a user as a second image, and
   a perceived distance from the user to the second image is greater than a distance from the user to the lens.

2. The device of claim 1, wherein the second mirror is disposed in the second direction relative the first mirror at a distance less than or equal to the second focal length.

3. The device of claim 1, wherein the lens is disposed in the third direction relative the second mirror at a distance less than or equal to the third focal length.

4. The device of claim 1, wherein the lens is a magnifying lens.

5. The device of claim 1, wherein the image is corrected by at least one of the lens, the first mirror, the second mirror, a second lens, and a curve in the display, the second lens disposed in the first direction relative the display.

6. The device of claim 5, wherein at least one of the lens, the first mirror, and the second mirror comprise a cylindrical access bend.

7. The device of claim 1, wherein the second mirror is disposed in the second direction from the display at a distance less than or equal to the respective distance to the second focal point.

8. The device of claim 1, wherein:
   the lens is aligned with an opaque surface such that a line between a user and the opaque surface intersects with the lens; and
   the display is operable to display an image corresponding to a scene opposite the opaque surface relative to the user, such that the user may perceive the scene through the opaque surface.

9. The device of claim 1, further comprising a housing having an opening and substantially enclosing the display, first mirror, second mirror, and lens, the opening substantially aligned with the lens, wherein the light transmitted in the fourth direction as the second image is displayed on a display surface of the device in connection with the housing.

10. The device of claim 1, further comprising:
    an imager communicatively connected the display, the imager operable to image a scene;
    wherein first image corresponds to the scene.

11. The device of claim 10, wherein the scene corresponds to an area substantially rearward relative a vehicle.

12. The device of claim 1, wherein the second image is substantially the entirety of the first image.

13. The device of claim 1, wherein the second image is only part of the first image.

14. The device of claim 13, wherein the part of the first image corresponding to the second image changes based, at least in part, on the user's position.

15. The device of claim 13, further comprising a user interface operable to move the first image such that the part corresponding to the second image changes.

16. The device of claim 1, wherein the second image appears to be at least 150 mm further away from the user than the lens.

17. The device of claim 12, further comprising a second imager communicatively connected to the display, the second imager operable to image a second scene, wherein the scene and the second scene are stitched together to form the first image.

18. A device comprising:
    a display operable to emit light in a first direction, the emitted light corresponding to a first image;
    a plurality of mirrors, each having a mirror focal length and operable to reflect the light from one direction to another direction, wherein the plurality of mirrors, in cooperation, are operable to reflect the light from the first direction to a second direction and from the second direction to a third direction; and
    a lens having a lens focal length, wherein the lens receives the light from the third direction and outputs the light in a fourth direction;
    wherein:
    the light transmitted in the fourth direction is displayed on a display surface of the lens viewable by a user as a second image, a perceived distance from the user to the second image is greater than a distance from the user to the lens, and the second image is only part of the first image.

19. The device of claim 18, wherein the part of the first image corresponding to the second image changes based, at least in part, on the user's position.

20. The device of claim 19, further comprising a user interface operable to move the first image such that the part corresponding to the second image changes.

\* \* \* \* \*